United States Patent
Lam

(10) Patent No.: US 12,014,362 B2
(45) Date of Patent: Jun. 18, 2024

(54) PEER-TO-PEER CRYPTOCURRENCY AND CRYPTO ASSET TRADING PLATFORM

(71) Applicant: VVOW Company Limited, Hong Kong (HK)

(72) Inventor: Chi Ho Lam, Hong Kong (HK)

(73) Assignee: VVOW Company Limited, Hong Kong (HK)

( * ) Notice: Subject to any disclaimer, the term of this patent is extended or adjusted under 35 U.S.C. 154(b) by 142 days.

(21) Appl. No.: 17/945,133

(22) Filed: Sep. 15, 2022

(65) Prior Publication Data

US 2023/0015219 A1     Jan. 19, 2023

Related U.S. Application Data

(63) Continuation of application No. 16/429,075, filed on Jun. 3, 2019, now Pat. No. 11,481,761.
(Continued)

(51) Int. Cl.
*G06Q 20/36*     (2012.01)
*G06Q 20/10*     (2012.01)
(Continued)

(52) U.S. Cl.
CPC ....... *G06Q 20/3678* (2013.01); *G06Q 20/108* (2013.01); *H04L 9/14* (2013.01);
(Continued)

(58) Field of Classification Search
CPC ............. G06Q 20/3678; G06Q 20/108; G06Q 2220/00; G06Q 20/065; G06Q 20/223;
(Continued)

(56) References Cited

U.S. PATENT DOCUMENTS

| 9,569,771 | B2 * | 2/2017 | Lesavich | ............... H04L 63/102 |
| 2010/0226496 | A1 * | 9/2010 | Akiyama | ............. H04L 9/3093 380/28 |

(Continued)

OTHER PUBLICATIONS

Ibrahim, "Secure and Robust Enterprise Digital Rights Management Protocol with Efficient Storage", 2015, International Journal on Information. 18. 625-640. (Year: 2015).*

*Primary Examiner* — Patrick McAtee
*Assistant Examiner* — Nakia Leffall-Allen

(57) ABSTRACT

A method for cryptocurrency exchange between multiple parties using threshold signature cryptocurrency wallets includes steps for creating threshold signature cryptocurrency wallets shared between a set of parties and a mediator for trading cryptocurrencies. The method may include steps for dividing a threshold private key, corresponding to each of the threshold signature cryptocurrency wallets, into n shares based on (t, n)-threshold signature scheme and sharing masked shares, corresponding to the threshold private key for each of the threshold signature cryptocurrency wallets, by the set of parties and the mediator. The method may include steps for validating correctness of all masked shares of the threshold private keys by the set of parties and the mediator. The method may include steps for signing a withdrawal cryptocurrency transaction jointly by the set of parties or signing a withdraw deposit transaction jointly by the at least one party and the mediator.

5 Claims, 9 Drawing Sheets

Related U.S. Application Data

(60) Provisional application No. 62/679,973, filed on Jun. 3, 2018.

(51) Int. Cl.
*H04L 9/14* (2006.01)
*H04L 9/32* (2006.01)

(52) U.S. Cl.
CPC ....... *H04L 9/3247* (2013.01); *G06Q 2220/00* (2013.01); *H04L 2209/56* (2013.01)

(58) Field of Classification Search
CPC .......... G06Q 20/36; G06Q 40/04; H04L 9/14; H04L 9/3247; H04L 2209/56; H04L 9/085; H04L 9/50; H04L 9/3239; H04L 9/3255
See application file for complete search history.

(56) References Cited

U.S. PATENT DOCUMENTS

| | | | |
|---|---|---|---|
| 2016/0292672 A1* | 10/2016 | Fay | G06Q 20/06 |
| 2018/0075453 A1* | 3/2018 | Durvasula | G06Q 20/3678 |
| 2018/0285217 A1* | 10/2018 | Smith | G06F 21/00 |
| 2020/0074464 A1* | 3/2020 | Trevethan | G06Q 20/065 |
| 2020/0145231 A1* | 5/2020 | Trevethan | H04L 9/085 |
| 2020/0219099 A1* | 7/2020 | Mohassel | H04L 9/0643 |
| 2021/0090072 A1* | 3/2021 | Sewell | G06Q 20/3678 |
| 2021/0152371 A1* | 5/2021 | Fletcher | H04L 9/3247 |

\* cited by examiner

PEER-TO-PEER CRYPTOCURRENCY AND CRYPTO ASSET TRADING PLATFORM

CROSS REFERENCE TO RELATED APPLICATION

The present application is a Continuation Application of U.S. application Ser. No. 16/429,075 filed on Jun. 3, 2019, which claims priority from US provisional application (U.S. Ser. No. 62/679,973) filed on Jun. 3, 2018, the contents of which are incorporated herein by reference in its entirety.

FIELD OF INVENTION

The present application relates to the field of crypto currency exchange. More particularly, the present application related to decentralized exchange of crypto assets between multiple parties and secure wallet services.

BACKGROUND

Now-a-days, cryptocurrencies are primarily traded on centralized exchanges (CEXs) where users' funds are at risk due to attacks from hackers and platform managers. Decentralized exchanges (DEXs) and atomic swaps allow users to retain control of their funds as trades are mediated by way of smart contracts or transaction scripts on a blockchain. It is believed that the next generation trading platform for crypto or tokenized assets will be a decentralized peer-to-peer trading platform that may empower users to trade all types of assets, across fungible and non-fungible tokens in a safe, secure and transparent way. Unfortunately, these technologies are slow, hard to use, and are restricted to trades on limited blockchain. In order to grow a healthy crypto asset trading ecosystem, two critical issues need to be resolved, namely how to improve the safety level of crypto exchanges and how to increase the liquidity of crypto assets.

From the notable hack of Mt. Gox in 2014, to the recent hacks of Bithumb in South Korea, the stories of exchanges being hacked keep repeating themselves without any significant solutions. Some people have lost a lot of money due to this. Centralized Exchanges (CEXs) have spent huge amounts of money strengthening their security but none of them have really succeeded in providing additional security. The main issue is that all CEXs hold lots of assets which are not secure from outsider or insider hackers. Fundamentally, not holding any assets will solve this issue because it means nobody can steal or hack them. However, regarding CEXs, if they don't hold assets, they cannot guarantee completion of the trade. To address this problem, a solution is required to keep the assets in a secure way such that a single party cannot withdraw the assets.

Users of the blockchain world are trying to solve this issue. Decentralized Exchange (DEX) is a technology that facilitates cryptocurrency trading on a distributed ledger. Compared to a Centralized exchange, DEX gives the control of funds and trades to the user which eliminates the single point of failure. DEX builds the trading logic using a smart contract. With this approach, it allows the user to exchange the crypto assets on the same chain. There are a few projects that allow users to trade with crypto assets across chain using smart contracts to verify transactions on other chains. Unfortunately, this approach requires trust in an oracle that provides information about the external chain and cannot be fully implemented on blockchain without smart contracts, such as Bitcoin.

Another technology popular in currency exchange is atomic swap. Atomic swap offers an approach to facilitate cross-chain trades without trusting a third party. These swaps make use of hash time-locked contracts (HTLC), a multisignature transaction scheme that requires cooperation from both parties for a trade to be successful on the blockchain. Multisig also allows t-out-of-n parties to sign a transaction. However, multi-sig depends on the protocol of the blockchain. For example, with Bitcoin, it is implemented as operation code, while with Ethereum, it is implemented as a smart contract. Also, there is no guarantee that the HTLC and multi-sig transaction scheme are always supported by the blockchain. Therefore, it limits the tradable crypto assets. Also, this approach is slow in practice and is not suitable for high volume exchange. Further, the technical prerequisite of applying atomic swap is quite high. Both currencies need to have the same hash algorithm and can support time lock contracts. This new technology raises lots of uncertainties in terms of supporting new blockchain platforms.

Hence, a safe and secure peer-to-peer trading environment is desired to encourage more users to participate in crypto trading. As the number of users involved in trading increases, the liquidity for all crypto assets will increase. However, most of the DEX implemented smart contracts have failed to generate significant volume due to inefficiencies in their design that impose high friction costs on market makers. In particular, these implementations place their order books on the blockchain which requires market makers to spend money each time they post, modify or cancel an order. While the cost of a single transaction is small, frequently modifying orders in response to evolving market conditions is quite expensive. In addition to imposing high costs on market makers, maintaining an on-chain order book results in transactions that consume network bandwidth and bloat the blockchain without necessarily resulting in value transfer.

Market makers or frequent traders can use CEXs for their frequent trades but again, it raises safety issues especially for professional traders who need to transfer a huge volume of crypto assets to CEXs which is not reliable. Therefore, solving the safety issues will also provide a secure environment for professional traders to work without worries. Furthermore, a platform easy to use is desired for market takers and market makers. The whole trading market should be opened up for everyone to participate, irrespective of whether they are a market maker or market taker.

To help move the public to a peer-to-peer trading paradigm and to improve the blockchain ecosystem, a secure marketplace is simply not sufficient. The liquidity of all digital assets needs to be improved in order to empower people to participate in crypto asset trading easily, and with total confidence.

Hence, a peer-to-peer cryptocurrency and crypto asset trading platform served as a marketplace where peer can place their desire crypto asset by offering the crypto assets they owned on the platform is desired, so that anyone can choose to trade their crypto assets directly with any crypto asset owner without depositing any cryptocurrency to a centralized wallet under an escrow service provided by the trading platform.

SUMMARY

The summary is provided to introduce concepts related to a system and method for cryptocurrency exchange between multiple parties using threshold signature cryptocurrency wallets and secure crypto asset wallet service. This summary is not intended to identify essential features of the claimed subject matter nor is it intended for use in determining or limiting the scope of the claimed subject matter.

In one implementation, a method for cryptocurrency exchange between multiple parties using threshold signature cryptocurrency wallets, is illustrated. The method may comprise steps for creating threshold signature cryptocurrency wallets shared between a set of parties and a mediator for trading cryptocurrencies. The set of parties may comprise at least one buyer and at least one seller, wherein the threshold signature cryptocurrency wallets comprise at least one threshold signature cryptocurrency wallet for the at least one seller's cryptocurrency and at least one threshold signature cryptocurrency wallet for the at least one buyer's cryptocurrency. The method may comprise steps for dividing a threshold private key, corresponding to each of the threshold signature cryptocurrency wallets, into n shares based on (t, n)-threshold signature scheme. The method may comprise steps for sharing masked shares, corresponding to the threshold private key for each of the threshold signature cryptocurrency wallets, by the set of parties and the mediator. The method may comprise steps for validating correctness of all masked shares of the threshold private keys by the set of parties and the mediator. The method may comprise steps for signing a withdrawal cryptocurrency transaction jointly by the set of parties, when the correct amount of cryptocurrency is transferred into the threshold wallets for exchange within a predetermined time period. The method may comprise steps for signing a withdraw deposit transaction jointly by the at least one party and the mediator.

In one implementation, a system for cryptocurrency exchange between multiple parties using threshold signature cryptocurrency wallets is illustrated. The system may be configured for creating threshold signature cryptocurrency wallets shared between a set of parties and a mediator for trading cryptocurrencies. The set of parties may comprise at least one buyer and at least one seller, wherein the threshold signature cryptocurrency wallets comprise at least one threshold signature cryptocurrency wallet for the at least one seller's cryptocurrency and at least one threshold signature cryptocurrency wallet for the at least one buyer's cryptocurrency. The system may be configured for dividing a threshold private key, corresponding to each of the threshold signature cryptocurrency wallets, into n shares based on (t, n)-threshold signature scheme. The system may be configured for sharing masked shares, corresponding to the threshold private key for each of the threshold signature cryptocurrency wallets, by the set of parties and the mediator. The system may be configured for validating correctness of all masked shares of the threshold private keys by the set of parties and the mediator. The system may be configured for signing a withdrawal cryptocurrency transaction jointly by the set of parties, when the correct amount of cryptocurrency is transferred into the threshold wallets for exchange within a predetermined time period. The system may be configured for signing a withdraw deposit transaction jointly by the at least one party and the mediator.

In one implementation, a method for provide secure crypto asset wallet service is illustrated. The method may comprise steps for creating a threshold signature cryptocurrency wallet shared between at least one party and a mediator for maintaining cryptocurrency. The threshold signature cryptocurrency wallet is configured for securing cryptocurrency of the at least one party. The method may comprise steps for dividing a threshold private key, corresponding to each of the threshold signature cryptocurrency wallets, into n shares based on (t, n)-threshold signature scheme. The method may comprise steps for sharing of masked shares corresponding to the threshold private key for each of the threshold signature cryptocurrency wallet, by the at least one party and the mediator. The method may comprise steps for validating correctness of all shared masked shares corresponding to the threshold private key by the at least one party and the mediator based on JVRSS protocol. The method may comprise steps for enabling signing of a withdrawal cryptocurrency transactions jointly by the at least one party and the mediator.

DETAIL DESCRIPTION

Figure 1:
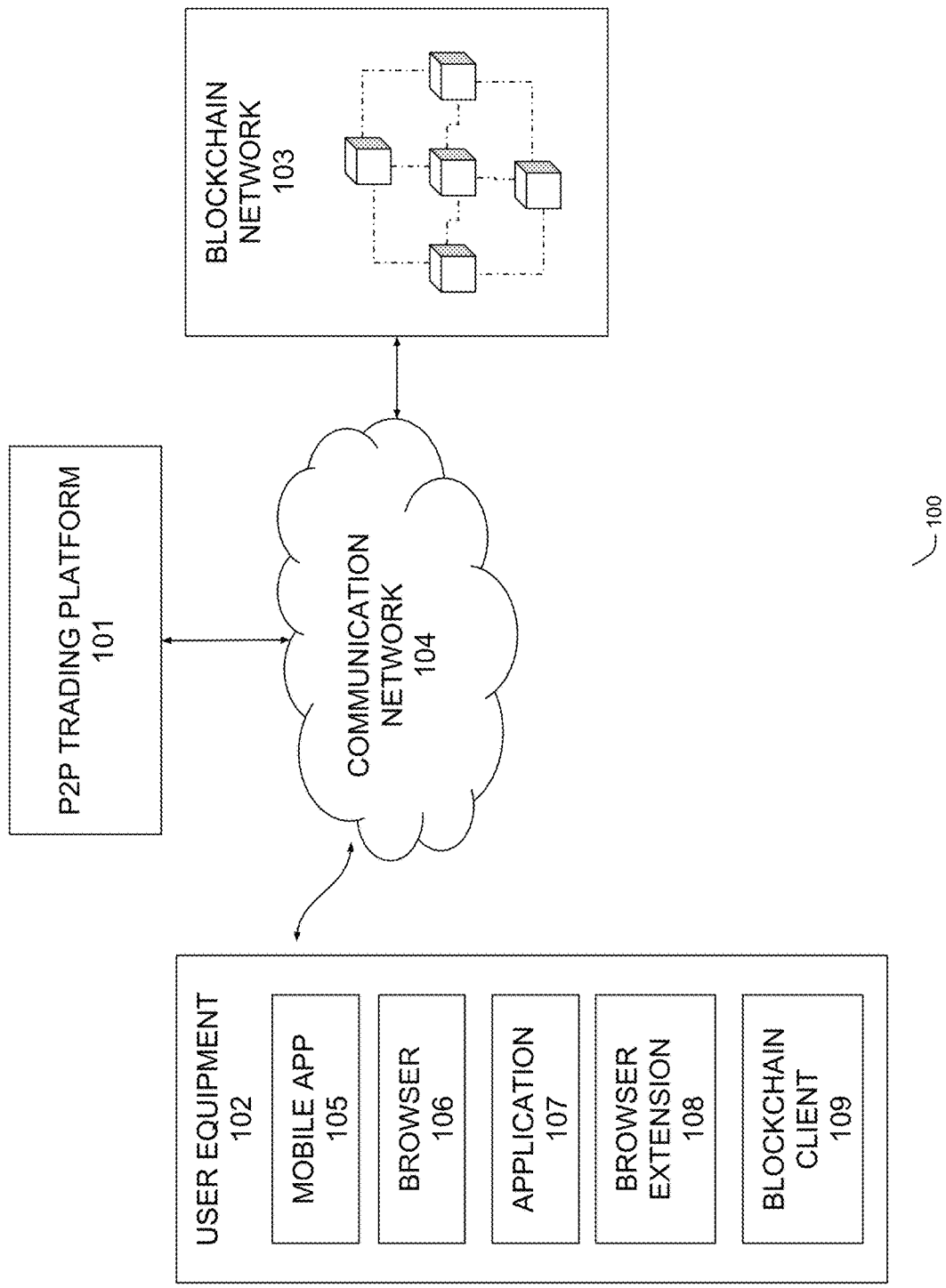
FIG. 1 illustrates a block diagram of a brief, general description of a representative environment/system for cryptocurrency exchange between multiple parties using threshold signature cryptocurrency wallets may be implemented.

To minimize the risk of CEXs and to address the limitation of DEXs, it is desired to enable a cross-chain value exchange protocol based on a threshold signature scheme. Threshold signature is a mechanism that allows multiple parties to hold partial secrets of the wallet on a blockchain, and only a part of the parties is needed to collaborate together to unlock the crypto assets from the wallet.

In the present disclosure, a system to support a P2P cross-chain crypto asset exchange is illustrated. The P2P cross-chain crypto asset exchange is based on a threshold signature scheme to facilitate a P2P cross-chain crypto asset exchange. The system provides a universal, secure and direct way for traders to exchange crypto assets across different chains without hassle. The benefit of this mechanism is that it applies to the signature level instead of the protocol level. Regardless of the protocol limitation of the blockchain, there is no limitation for the proposed system when applied to different blockchains.

The system enables seamless application of the P2P cross-chain crypto asset exchange across different blockchains even in the extreme case in which the underlying blockchain does not support multisig. Further, the system enables a protocol that can practically apply threshold signature as the digital signing technology. The protocol allows two mutually distrusting parties to jointly exchange crypto assets such that both parties receive the other party's crypto assets or neither one does. Furthermore, the threshold signature can be universally applied to most blockchain platforms because the threshold signature applies at the signature level instead of the native blockchain protocol level and there is no dependency on the blockchain protocol to provide compatibility in the way of changing core code, input scripts or smart contracts.

Further, the platform is transparent to all parties and anyone who can access blockchain nodes or block explorer can witness the transfer of ownership that is required to complete the trade. Furthermore, instead of favoring a heavy loading order book mechanism for price discovery that is usually used in CEXs and DEXs, the system proposes programmable market maker tools that empower market makers to design their algorithmic trading strategy so the offer of trade is always available, and the trade is fulfilled automatically from the market maker's side. Furthermore, the system enables market takers complete trades almost instantly as a result of the availability and liquidity provided by market makers. Furthermore, the system operates without the need to register an account beforehand.

In one embodiment, a peer-to-peer cryptocurrency and crypto asset exchange platform of the present application may include a trading platform, a user equipment, a communication network and a blockchain network. The trading platform allows peer/party/users placing their desire trading pairs and price, serving as an escrow for the peer trading and recording and showing the trading history of the trader. The user equipment component includes mobile, browser, application, browser extension and blockchain client, which served as the front-end to interact with the trading platform and sending transaction to the blockchain. The communication network allows the message handshakes between trading platform, trading peers and blockchain network. The blockchain network allows the communication to the blockchain.

The peer-to-peer cryptocurrency and crypto asset exchange platform may implement a protocol for the cryptocurrency trading peers to form a threshold wallet with the trading platform on the related cryptocurrency blockchain, wherein the wallet can be controlled by both the exchange platform and any of the trading peers cooperatively. The crypto asset exchange platform enables a protocol to claim the cryptocurrency from the threshold wallet for both success and unsuccessful trade, and a method to discourage peer from placing fake order and match order without sending any crypto assets.

The protocol for the cryptocurrency trading peers to form a threshold wallet with the platform may include several rounds of message exchange for Threshold-Gen-Key algorithm and Threshold-Gen-Signature algorithm.

The protocol to claim the cryptocurrency from the threshold wallet for both success and unsuccessful trade may include checking the outstanding balance of the threshold wallet via different blockchain network, performing Threshold-Gen-Signature algorithm between the trading platform and any one of the trading peers.

The method to discourage peer from placing fake order and match order without sending any crypto assets may include tracking and showing all the trading history of the trading peers, allowing peers to accept or reject for any matching orders, allowing peers choose who they can trade with.

The above is to introduce a selection of concepts in a simplified form that are further described below.

Embodiments of the present application provide a peer-to-peer cryptocurrency exchange platform. The peer-to-peer exchange platform allows users to buy and sell crypto currencies and eliminate the vulnerability to misbehavior by the mediator (i.e., the exchange platform), which can simply pocket the buyer's or seller's crypto currency and never transfer it to the counterparty. The exchange service is based on threshold digital signature escrow protocol utilized by embodiment of the present application. All transactions are also transparent and public verifiable.

FIG. 1 illustrates a block diagram of a brief, general description of a representative environment/system for cryptocurrency exchange between multiple parties using threshold signature cryptocurrency wallets may be implemented.

The computing environment 100 is only one example of a suitable computing environment and is not intended to suggest any limitation as to the scope of user or functionality. Neither should the computing environment 100 be interpreted as having any dependency or requirement relating to any one or combination of components illustrated in the exemplary operating environment.

The representative environment 100 may include a user equipment 102 and p2p cryptocurrency trading platform 101, communication network 104 and blockchain networks 103 for the corresponding trading crypto currencies. The user equipment 102 operate as a client for the set of parties to send and receive cryptocurrency trading order data to and from the p2p cryptocurrency trading platform 101. The p2p cryptocurrency trading platform 101 acts as a mediator between the set of parties. The client application may be implemented in different computer languages, executables or channels which may include mobile app 105, web applications using internet browsers 106, native computer applications 107 or browser extensions 108. Users may also use compatible cryptocurrency blockchain client 109 to send and receive cryptocurrencies to and from the threshold wallets jointly created by users and the p2p cryptocurrency trading platform 101. Both users and the p2p cryptocurrency trading platform 101 will need to communicate with the corresponding blockchain network 103 to send, receive and verify cryptocurrency transactions exchanged during the trade.

Figure 2:
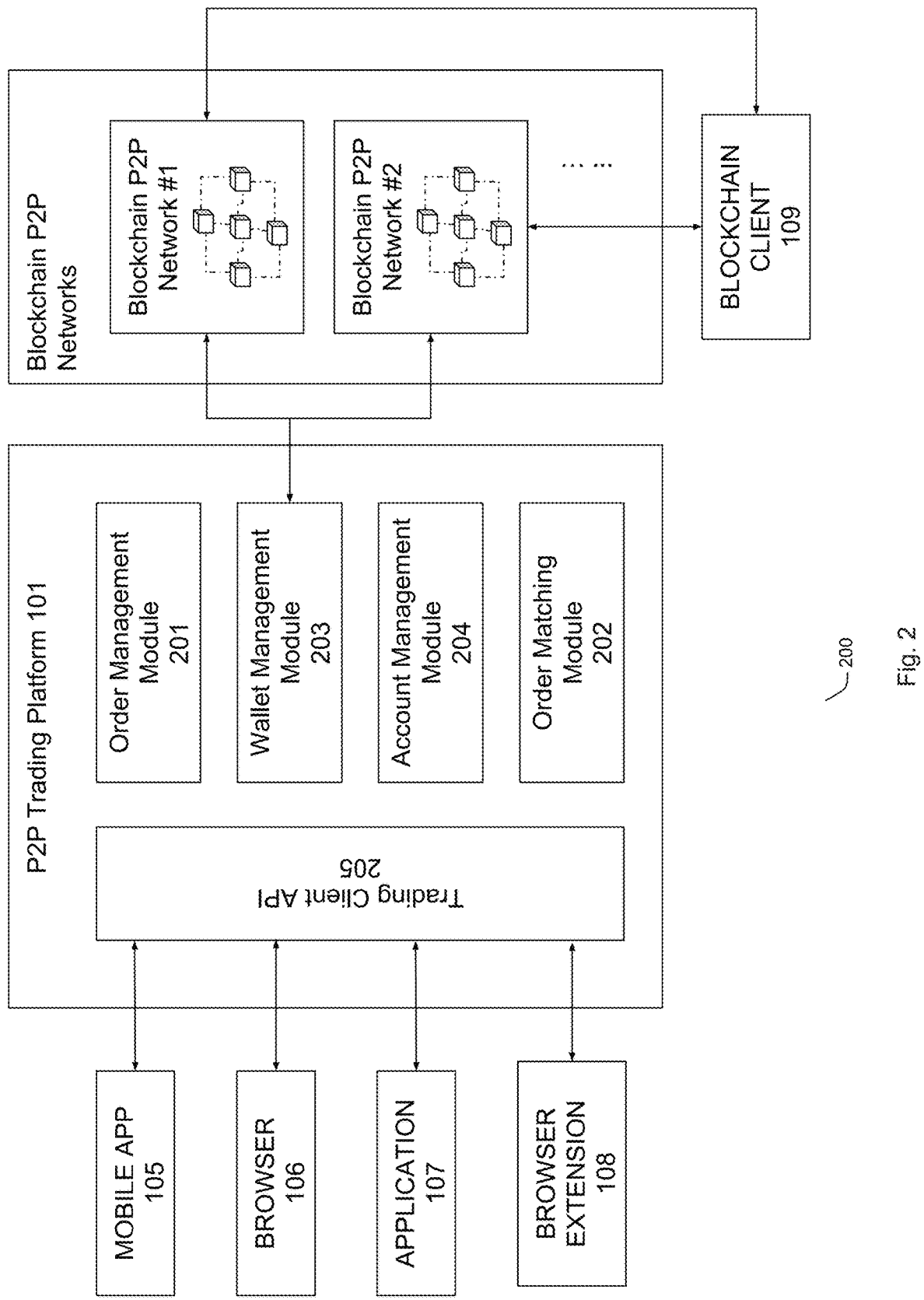
FIG. 2 illustrates a block diagram of an exemplary component architecture for the p2p cryptocurrency trading platform utilized by the embodiments of the present application.

FIG. 2 illustrates a block diagram of an exemplary component architecture 200 for the p2p cryptocurrency trading platform 101 utilized by the embodiments of the present application.

The cryptocurrency trading platform 101 may include an order management module 201, an order matching module 202, a wallet management module 203, an account management module 204 and a trading client application programming interface (API) 205. The order management module 201 allows users to post buy and sell orders for which cryptocurrency they would like to exchange for. The order matching module 202 allows users to search through or browser the order book for a satisfactory offer in the order book. If none can be found, users may create their own buy or sell order with the order management module 201 and specify the terms of the deals as they like. Once an order is matched, the wallet management module 203 kicks in to facilitate the formation of threshold signature cryptocurrency wallets, one for the seller's cryptocurrency and one for the buyer's cryptocurrency. In one embodiment, a set of parties may be involved in trading the crypto assets. The threshold signature cryptocurrency wallets shared between the set of parties and a mediator/p2p cryptocurrency trading platform 101 for trading cryptocurrencies is generated. The set of parties comprise at least one buyer and at least one seller, wherein the threshold signature cryptocurrency wallets comprise at least one threshold signature cryptocurrency wallet for the at least one seller's cryptocurrency and at least one threshold signature cryptocurrency wallet for the at least one buyer's cryptocurrency. Threshold signature scheme is a technology that allows multiple parties to form a share wallet together. Each party owns part of the secret of the wallet such that no single party can unlock the wallet themselves unless t of them works together to calculate the signature for executing the transaction. The proposed threshold signature scheme is a more generic solution that can be applied to different blockchains as it works at the signature level instead of the protocol level. In one embodiment, a (t, n)-threshold signature scheme is utilized by the embodiment of the present application which distributes signing power/threshold private key to n shares such that any group of at least t+1 parties can generate a signature. For the present application, each buyer and seller owns 1 share of the signing secret and the mediator/p2p cryptocurrency trading platform 101 owns n–2 shares of the secret. It must be noted that t should be greater than or equal to n–2 such that the trading platform 101 cannot generate a signature by its own. The wallet management module 203 is responsible for generate and sign all cryptocurrency transactions in and out of the jointly formed threshold signature wallets. The account management module 204 helps to prevent potential fraudulent activities, and it may introduce different kinds of security features. Typically, they are a reputation-based system of community arbitrators, obligatory deposits for the duration of a trade etc. The account management module 204 may utilize information extracted from the order management module 201 to determine whether a user is a legitimate user. The account management module 204 may automatically penalize users or computers that attempt to defraud the peer-to-peer cryptocurrency exchange system. The trading client API 205 provides a set of application programing interfaces for the client applications which may include mobile app 105, web applications using internet browsers 106, native computer applications 107 or browser extensions 108 to interact with different modules in the p2p cryptocurrency exchange platform 101.

The p2p cryptocurrency exchange platform 101 employs the threshold signature scheme that demonstrates a robust property in the sense that even with the presence of corrupted players, uncorrupted players can still successfully generate signatures. The threshold signature scheme also includes auxiliary information exchange, which allows parties to verify their shares consistently in order to prevent corruption at the very outset.

In one example, consider three parties, Alice, Bob and mediator/p2p cryptocurrency exchange platform 101 involved in a transaction. The p2p cryptocurrency exchange platform 101 enables all of parties to generate a shared wallet by Joint Creation of Public Key and Joint Signature Generation. In the first step, the p2p cryptocurrency exchange platform 101 enables each party to generate a local secret $\alpha_{ii}$ and shared secrets $\alpha_{ij}$. The shared secrets $\alpha_{ij}$ is sent to other parties securely, such that each party holds a local secret $\alpha_{ii}$ and shared secrets $\alpha_{ij}$ from other parties. Furthermore, p2p cryptocurrency exchange platform 101 enables each party to generate a partial public key $Q_i = G \times \Sigma \alpha_{ji}$, where G is the finite field of elliptic curve calculation and share the partial public key with other parties, such that a complete public key will be obtained by combining these partial public key $Q = \oplus Q_i$. The public key is then used as the share wallet address, such that the share wallet address is the same as the wallet address on a different blockchain.

Furthermore, p2p cryptocurrency exchange platform 101 enables joint signature generation, wherein when any one of the parties wants to withdraw the crypto assets (say Alice), he has to cooperate with one of the remaining parties, for example, the p2p cryptocurrency exchange platform 101. Each party then calculates the partial signature of the withdrawal transaction. The signature for the withdrawal transaction can be generated by combining the partial signature.

There are three major benefits to use the threshold signature scheme—Universal, Transparent and Secure. By using the threshold signature, the exchange of crypto assets takes place on the blockchain as per a normal crypto asset transfer transaction. All transactions can be traced on the corresponding crypto asset blockchain.

Since this mechanism works at the signature level, the share wallet generated using Joint Creation of Public Key is no different to a typical wallet as well as the signature generated using Joint Signature Generation. Therefore, the threshold signature mechanism can be applied to any blockchain that uses the public and private key for controlling crypto assets. This is a universal solution for most blockchains currently available in the market and allows support for unlimited trading pair in an easy and safe way.

The threshold signature scheme requires multiple parties to own partial secrets/threshold private key of the wallet, and that no single party can control the crypto assets. This means that if one of the parties was hacked and the partial secret was stolen, there is no way the hacker can steal the crypto asset. This benefit greatly reduces the risk of losing crypto assets by theft, a common problem experienced with all centralized exchanges. This property also ensures that no one can withdraw crypto assets without the cooperation of the mediator. Doing so secures the P2P crypto asset exchange in a peer-to-peer world. With these three benefits, the threshold signature enabled by the p2p cryptocurrency exchange platform 101 empowers crypto currency marketplace to support the crypto community to trade their crypto assets in a P2P way securely across multiple chains. By doing this, the liquidity of all crypto assets in the crypto world is significantly improves.

Further, the threshold signature scheme can be applied to various situations. Its application is not only to secure P2P crypto asset exchange, and also there are unlimited application areas including, Crypto asset custody, Enterprise wallet management, Secret key protection in the cloud, Two-way blockchain pegging. In general, the p2p cryptocurrency exchange platform 101 vastly improves wallet security and safety by splitting the private key into different parties, and thus ensures multiple parties do not know each other's secrets.

Figure 3:
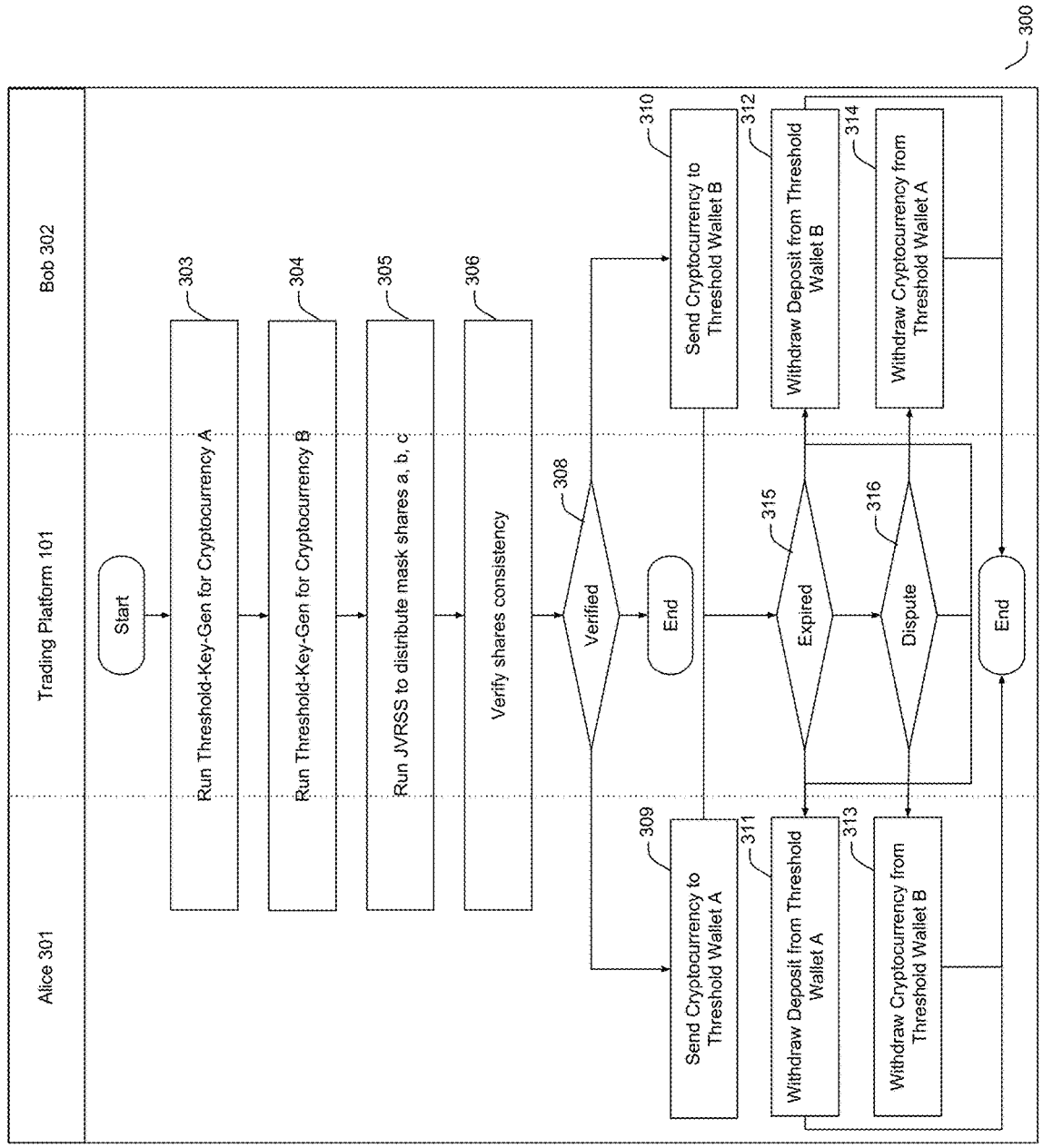
FIG. 3 illustrates a flow diagram, utilized by embodiments of the present application, which implements a method to escrow cryptocurrency exchange of two parties using two threshold signature cryptocurrency wallet addresses.

FIG. 3 illustrates a flow diagram, utilized by embodiments of the present application, which implements a method to escrow cryptocurrency exchange of two parties using two threshold signature cryptocurrency wallet addresses.

A (t, n)-threshold signature scheme is utilized by the embodiment of the present application which distributes signing power to n shares such that any group of at least t+1 players can generate a signature. For the present application, each buyer and seller owns 1 share of the signing secret and the p2p cryptocurrency trading platform 101 owns n−2 shares of the secret. t should be greater than or equal to n−2 such that the mediator/p2p cryptocurrency trading platform 101 cannot generate a signature by its own.

Consider an example wherein the two parties in the illustrated diagram are Alice 301 and Bob 302. Alice 301 wants to buy 1 unit of cryptocurrency B and is willing to pay up to 10 units of cryptocurrency A. Bob 302 wants to sell 2 unit of cryptocurrency B with a minimum price of 10 units of cryptocurrency A per unit of cryptocurrency A. Bob takes up Alice's offer and there is a match order. In step 303, Alice 301, Bob 302 and the p2p cryptocurrency trading platform 101 jointly run a threshold-key-gen protocol 500 to create a threshold signature wallet for cryptocurrency A and thus distributes signing power to Alice 301, Bob 302 and the p2p cryptocurrency trading platform 101. An exemplary value of (t, n) could be (t=1, n=3) or (t=2, n=4). In any case Alice 301 and Bob 302 will each keep 1 share of the secret private key. Similarly, in step 304, Alice 301, Bob 302 and the p2p cryptocurrency trading platform 101 jointly run a threshold-key-gen protocol 500 to create a threshold signature wallet for cryptocurrency B. For signature generation, Alice 301, Bob 302 and the p2p cryptocurrency trading platform 101 runs JVRSS protocol 400, in step 305, to distribute two sets of masked shares a, b and c for each cryptocurrency wallet A and B. Each of the parties then verify all the share secrets, in step 306, using formulas provided in step 408 and 409 of the JVRSS protocol 400. In decision step 308, if there are any secret shares that cannot pass the verification, the escrow protocol is aborted. If the verification is passed, now in step 309, Alice 301 can send 10 units of cryptocurrency A to threshold wallet A and wait for Bob 302, in step 310, to send 1 unit of cryptocurrency B to threshold wallet B. In case Bob 302 did not send the cryptocurrency B in time, Alice 301 can request the mediator/p2p cryptocurrency trading platform 101 to jointly sign a withdraw deposit transaction from threshold wallet A, in step 311, to get back her deposit of cryptocurrency A. If Bob 302 is able to send the right amount of cryptocurrency B in time, Alice 301 can then request the p2p cryptocurrency trading platform 101 to jointly sign a withdraw transaction from threshold wallet B, in step 313, to obtain her new acquisition of cryptocurrency B. Similar process applies to Bob 302, in step 310, Bob 302 can send 1 units of cryptocurrency B to threshold wallet B and wait for Alice 301, in step 309, to send 10 unit of cryptocurrency A to threshold wallet A. In case Alice 301 did not send the cryptocurrency A in time, Bob 302 can request the p2p cryptocurrency trading platform 101 to jointly sign a withdraw deposit transaction from threshold wallet B, in step 312, to get back her deposit of cryptocurrency B. If Alice 301 is able to send the right amount of cryptocurrency A in time, Bob 302 can then request the p2p cryptocurrency trading platform 101 to jointly sign a withdrawal transaction from threshold wallet A, in step 314, to obtain her new acquisition of cryptocurrency A.

Figure 4:
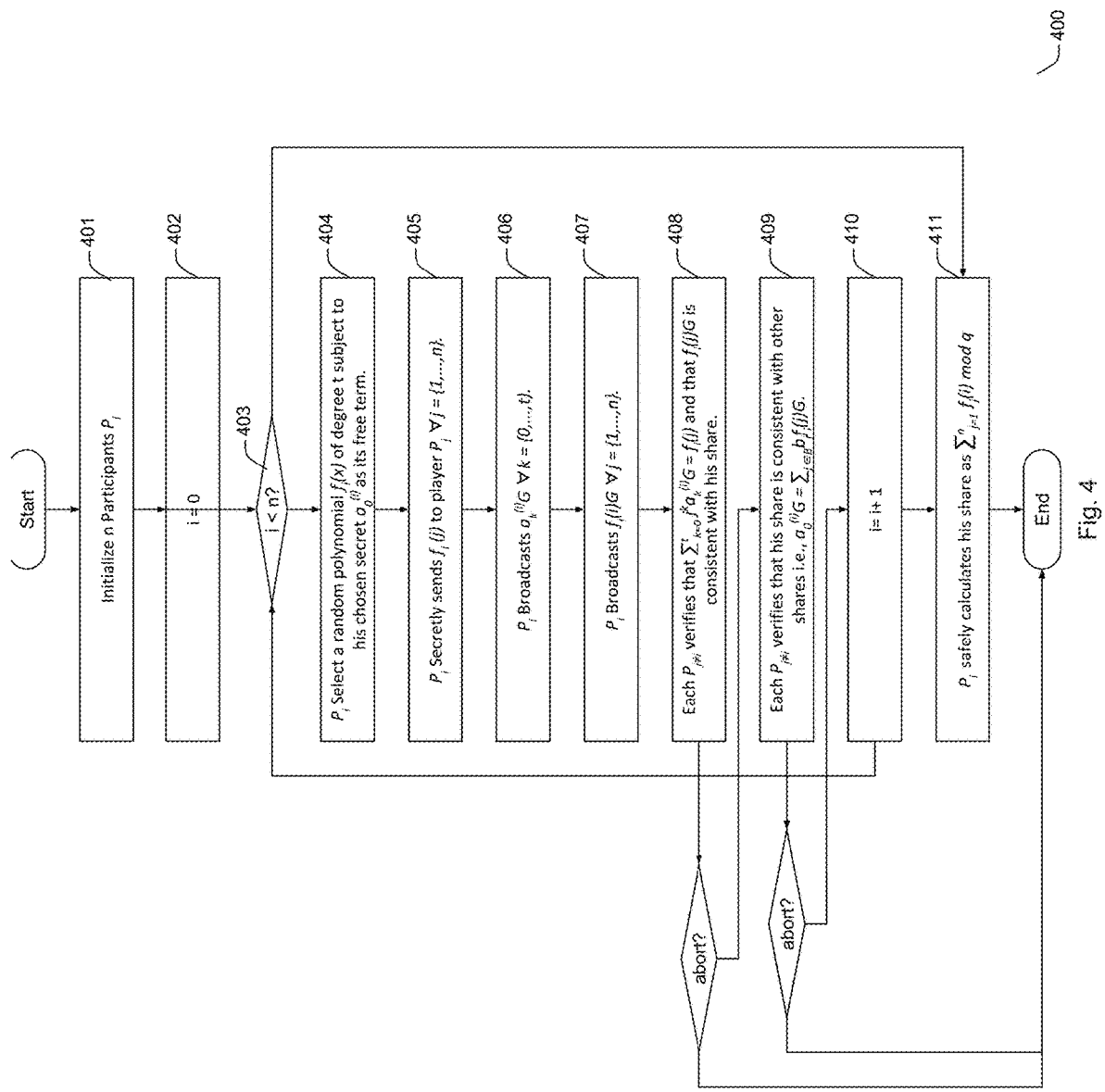
FIG. 4 illustrate a flow diagram, utilized by embodiments of the present application, which implements a method allows multiple parties to jointly generate a shared unconditional and public verifiable secret.

FIG. 4 illustrate a flow diagram, utilized by embodiments of the present application, which implements a method allows multiple parties to jointly generate a shared unconditional and public verifiable secret (JRVSS 400).

The goal of this method is for a group of participants to collectively share a private/secret key without knowledge of the secret. The method extends JRSS by having each party broadcast its polynomial coefficient and evaluation points, protected by elliptic curve scalar multiplication. The correctness of each party's polynomials and shares can then be verified by each other. In an exemplary implementation, 4 participants are initialized, in step 401, which includes Alice 301, Bob 302, and two participant servers from the p2p cryptocurrency trading platform and each is assigned a party number from i=1 . . . 4. An elliptic curve with cardinality q and generator G is also selected. For each participant $P_i$, in step 403, selects a random polynomial $f_i(x)$ of degree t subject to his chosen secret $a_0^{(i)}$ as its free term. $P_i$ then secretly sends $f_i(j)$ to all other participants $P_j$ in step 405. The secret channel is established through public key cryptography while participants exchange their public keys to each other. And thus the channel can be a direct channel or proxy through the p2p cryptocurrency exchange platform. In step 406, each participant $P_i$ broadcasts $a_k^{(i)} G \forall k=(0, \ldots, t)$. to all other participants $P_j$ which are its polynomial coefficients protected by elliptic curve scalar multiplication. $P_i$ also broadcasts $f_i(j)G \; \forall j=\{1, \ldots, n\}$ which are the evaluation points protected by elliptic curve scalar multiplication. Each participant $P_{j<,>i}$ can verify that $\Sigma_{k=0}^{t} j^k a_k^{(i)} G$ is equal to $f_i(j)$ and that $f_i(j)G$ is consistent with his share, in step 408. Each participant also verifies that his share is consistent with other shares, in step 409, by checking $a_0^{(i)} G = \Sigma_{j \in B} b_j f_i(j) G$ where b is the Lagrange interpolation coefficient. Once the above protocol is completed each player $P_i$ safely calculates his share as $\Sigma_{j=1}^{n} f_j(i) \bmod q$.

Figure 5:
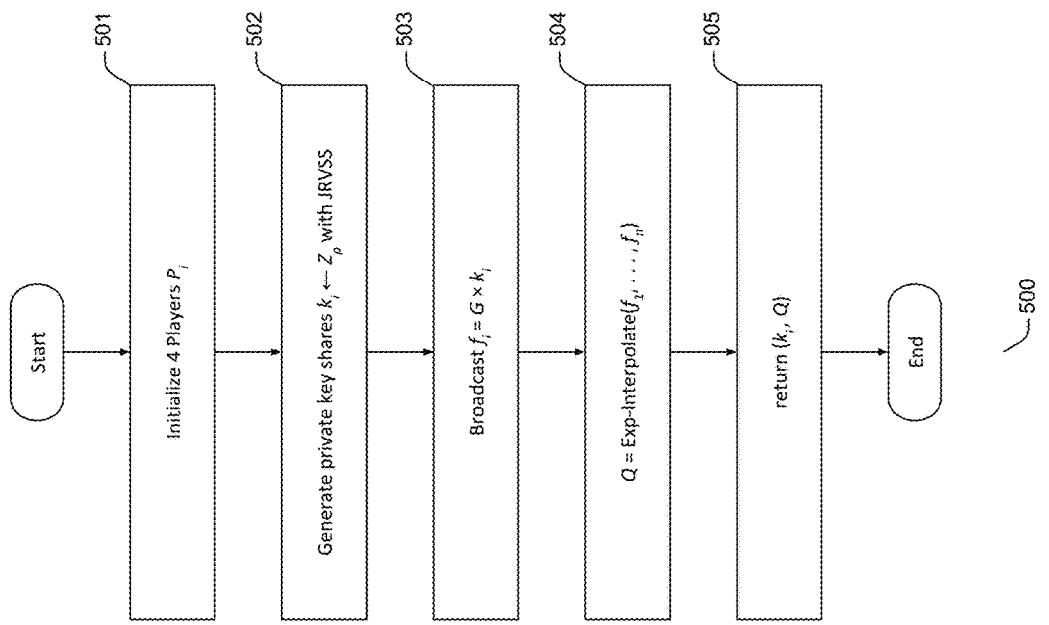
FIG. 5 illustrate a flow diagram, utilized by embodiments of the present application, which implements a method which allows multiple parties to jointly generate a secret key using JRVSS and publish the public key for the threshold escrow wallets.

FIG. 5 illustrate a flow diagram, utilized by embodiments of the present application, which implements a method which allows multiple parties to jointly generate a secret key using JRVSS 400 and publish the public key for the threshold escrow wallets (Threshold-Key-Gen 500).

Using this method, the private key generation is collectively chosen at random by all participants using JRVSS algorithm 400 to make the key generation robust. The domain parameter of this method is a selected elliptic curve with cardinality q and generator G and the output of this method is a public key Q, and private key share for each participant $k_i$. In an exemplary implementation, 4 participants are initialized, in step 501, which includes Alice 301, Bob 302, and two participant servers from the p2p cryptocurrency trading platform and each is assigned a party number from i=1 . . . 4. Private key shares $k_i$ of each participant are jointly generated, in step 502, using JRVSS protocol 400. To calculate the public key Q, each participant $P_i$, in step 503, broadcasts $f_i = G \times k_i$. The public key Q is then calculated by Exp-Interpolate function with inputs $(f_1, \ldots, f_n)$. Below is definition of Exp-Interpolate. The method returns private key share $k_i$ and public key Q in step 505.

Exp-Interpolate( ): for $\beta$=Exp-Interpolate$(w_1, \ldots, w_n)$, if $\{w_1, \ldots, w_n\}$ (n≥2t+1) is a set of values, such that at most t are null and the remaining ones are of the form $G \times a_i$, where the $a_i$'s lie on some t-degree polynomial H(•), then $\beta = G \times H(0)$. This can be computed by $\beta = \Sigma_{i \in V} w_i \times \lambda_i = \Sigma_{i \in V} (G \times H(i)) \times \lambda_i$, where V is a (t+1)-subset of the correct $w_i$'s and $\lambda_i$'s are the corresponding Lagrange interpolation coefficients.

Figure 6:
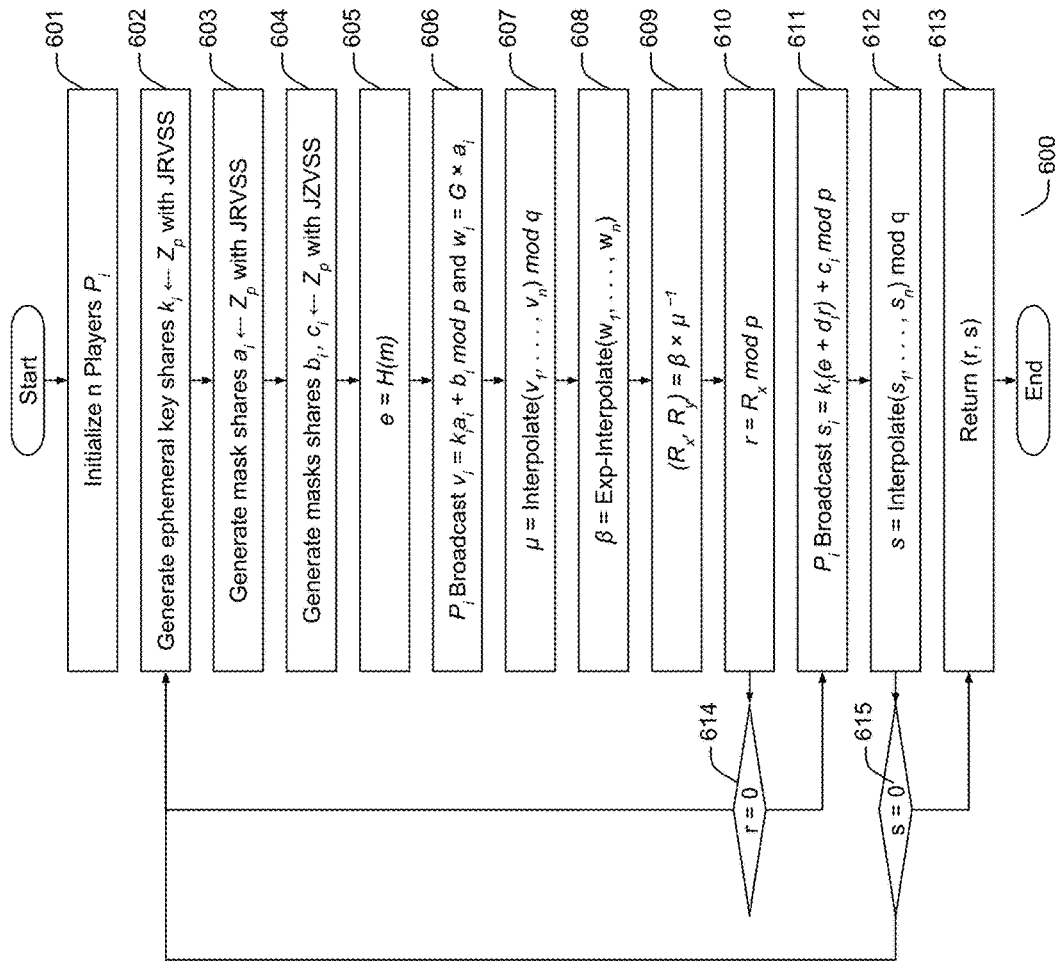
FIG. 6 illustrate a flow diagram, utilized by embodiments of the present application, which implements a method which allows multiple parties to jointly produce a threshold digital signature for the threshold escrow wallets transactions.

FIG. 6 illustrate a flow diagram, utilized by embodiments of the present application, which implements a method which allows multiple parties to jointly produce a threshold digital signature for the threshold escrow wallets transactions.

This method assumed that secret key generation has already been performed and the message, in this case is cryptocurrency transaction to be signed, was distributed prior to initiating the algorithm 600. Each step of the algorithm is to be executed by every participant. In an exemplary implementation, 4 participants are initialized, in step 601, which includes Alice 301, Bob 302, and two participant servers from the p2p cryptocurrency trading platform and each is assigned a party number from i=1 . . . 4. In step 602, the participants generate the ephemeral key k, uniformly distributed in $Z_p$ with a polynomial of degree t=1, using JRVSS algorithm 400, which creates shares $(k_1, \ldots, k_n) \leftarrow \rightarrow k$ mod q. Shares of k are to be kept secret by each participant. The participants then generate a random value a, uniformly distributed in Zq, with a polynomial of degree t, in step 603, using JVRSS 400 to create shares $(a_1, \ldots, a_n) \leftarrow \rightarrow a$ mod q. These are used to multiplicatively mask $k_i$. The shares of a are to be kept secret by the corresponding participant. Next, in step 604, the participants execute two instances of JZVSS with polynomials of degrees 2t. Denote the shares created in these protocols as $(b_1, \ldots, b_n) \leftarrow \rightarrow b$ mod q and $(c_1, \ldots, c_n) \leftarrow \rightarrow c$ mod q. These are used as additive masks. The polynomial must be of degree 2t because the numbers being masked involve the products of two polynomials of degree t, doubling the number of shares required to recover the secret. The shares of b and c are to be kept secret by the participants. In step 605, the digest of message m is calculated as e=H(m) where H is the designated hash function of the corresponding cryptocurrency. Participant Pi broadcasts $v_i = k_i a_i + b_i$ mod p and $w_i = G \times a_i$ in step 606. If participant $P_i$ does not participate his values are set to null. Notice that $(v_1, \ldots, v_n) \leftarrow \rightarrow ka$ mod q. In step 607, $\mu$=Interpolate$(v_1, \ldots, v_n)$ mod q is computed. If $\{v_1, \ldots, v_n\}(n \geq 2t+1)$ is a set of values, such that at most t are null and all the remaining ones lie on some t-degree polynomial F(•), then $\mu$=F(0). The polynomial can be computed by standard polynomial interpolation. Next, in step 608 $\beta$=Exp-Interpolate$(w_1, \ldots, w_n)$ is computed. In step 609 and 610, $(R_x, R_y) = \beta \times \mu^{-1}$ and $r = R_x$ mod p is computed. If r=0, go to step 602. Next, in step 611, each participant $P_i$ broadcast $s_i = k_i(e + d_i r) + c_i$ mod p. If $P_i$ does not participate, its values are set to null. Notice that $(s_1, \ldots, s_n) \leftarrow \rightarrow k(e + dr)$ mod q. In step 612, s=Exp-Interpolate$(s_1, \ldots, s_n)$ mod q is computed. If s=0, go to step 602. Finally, (r,s) as the digital signature of the transaction is returned in step 613.

Figure 7:
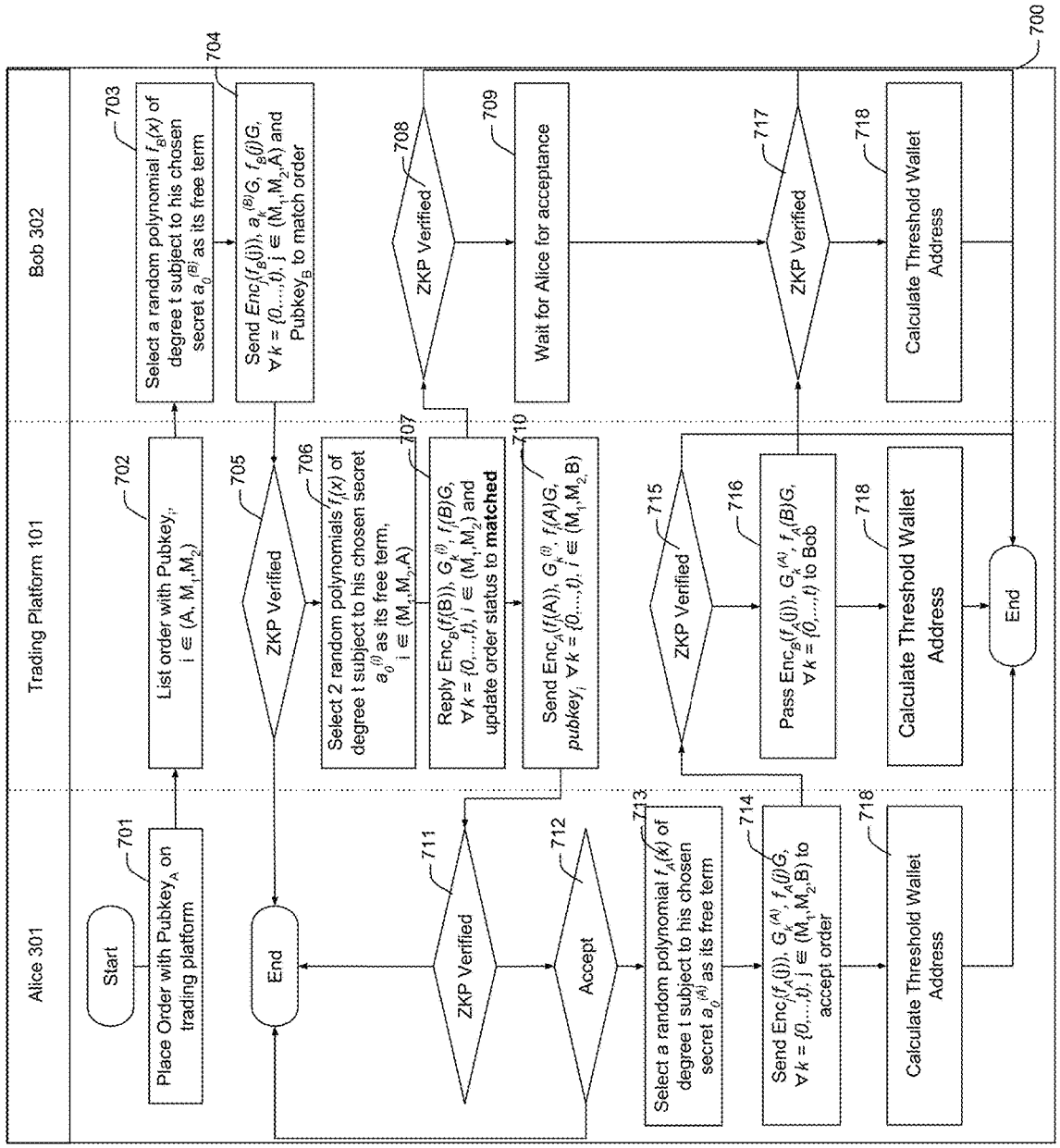
FIG. 7 illustrate a detailed flow diagram, utilized by embodiments of the present application, which implements a protocol for two exchange parties forming a threshold signature cryptocurrency wallet address with the escrow party.

FIG. 7 illustrates a detailed flow diagram, utilized by embodiments of the present application, which implements a protocol for two exchange parties forming a threshold signature cryptocurrency wallet address with the escrow party.

The goal of this protocol is to form a threshold signature cryptocurrency wallet with p2p cryptocurrency platform 101 which any one of the involved parties cannot control the cryptocurrency in the threshold wallet by it-self. The protocol may apply the Threshold-Key-Gen Algorithm 500 and also Threshold-Sign-Gen Algorithm 600 allowing 4 participants, including Alice 301 and Bob 302 acting as buyer and seller and two participant servers $M_1$, $M_2$ from the p2p cryptocurrency trading platform 101 acting as mediators, to execute cryptocurrency exchange under mediation. At the beginning step 701, Alice 301 places an order on the trading platform by providing her randomly generated public key together with the price, exchange cryptocurrency pair and maximum and minimum trading volume to the trading platform 101 to see if anyone is interested in her trading pair with her listed price. In step 702, the trading platform 101 generate 2 public keys representing the mediator 1 and lists the order with these 2 public keys together with the price, cryptocurrency pair and maximum and minimum trading volume together with the public key of Alice 301 generated in step 70. Further, in step 703, if Bob 302 is interested in the order, he may then select 2 sets of 6 random polynomials $f_i(x)$ of degree t subject to his chosen secret $a_0^{(i)}$ as its free term, and each set may be used for different cryptocurrency of the trading pair. For each set of the polynomials, there will be 1 polynomial for the JRVSS for the private key share in 502, 1 is for the JRVSS for the ephemeral key 603, 1 is for JRVSS for share a 604 and 3 is for JRVSS for share b, c, k in 605, so that there are 12 polynomials in total. In step 704, Bob secretly sends $Enc_j(f_i(j))$ to all other participants $P_j$ for $j \in (M_1, M_2, A)$ where $Enc_j(x)$ represents encrypting the value x using the public key of $P_j$ for $j \in (M_1, M_2, A)$, together with $a_k^{(B)}G$ 406 and $f_B(j)G$, for $j \in (M_1, M_2, A)$ 407. In step 705, trading platform 101 may perform a Zero-Knowledge Proof 408 and 409 to verify the local secrets from Bob 302. If the ZKP fails, trading platform 101 will return errors to Bob 302. If the ZKP passed, the trading platform 101 will then select 4 sets of 6 random polynomials $f_i(x)$ of degree t subject to his chosen secret $a_{M1,0}^{(i)}$ and $a_{M2,0}^{(i)}$ as the corresponding free term and 2 sets are representing $M_1$ and the other 2 sets are representing $M_2$ in step 706. For details of the polynomial, refer step 703. In step 704, the trading platform 101 replies $Enc_B(f_{M1}(B))$ and $Enc_B(f_{M2}(B))$ together with $a_k^{(i)}G$ 406 and $f_i(B)G$, for $i \in (M_1, M_2)$ 407 to Bob 302 and update the order status to matched. In Step 708, Bob 302 performs a ZKP 408 and 409, and waits for Alice 301 acceptance if the ZKP success. In step 710, trading platform 101 sends a match order notification from trading platform 101 together with $Enc_A(f_i(A))$, $a_k^{(i)}G$ 406 and $f_i(A)G$, for $i \in (M_1, M_2, B)$ to Alice 301. In step 711, Alice 301 performs ZKP to verify the local secrets owned by the trading platform 101 and Bob 302. If ZKP 408 and 409 failed, the process is stopped. If ZKP 408 and 409 success, Alice is allowed to accept or reject the match order in step 712. If Alice accepts, she will select 6 random polynomials $f_i(x)$ of degree t subject to his chosen secret $a_0^{(i)}$ free term in step 713. For details of the polynomial, refer step 703. In step 714, Alice 302 sends $Enc_j(f_A(j))$ together with $a_k^{(A)}G$ 406 and $f_A(j)G$, for $j \in (M_1, M_2, B)$ 407 to trading platform 101 and update the order status to accepted. In step 715, trading platform 101 performs ZKP 408 and 409 to verify the local secrets of Alice 301. If ZKP is verified, the p2p cryptocurrency trading platform 101 sends $Enc_B(f_A(B))$ together with $a_k^{(A)}G$ 406 and $f_A(B)G$ to Bob 302 in step 716. In step 717, Bobs performs ZKP 408 and 409 to verify the local secrets of Alice 301. In step 718, Alice 302, trading platform 101 and Bob 303 calculates the threshold wallet address according to 504 and 505.

Figure 8:
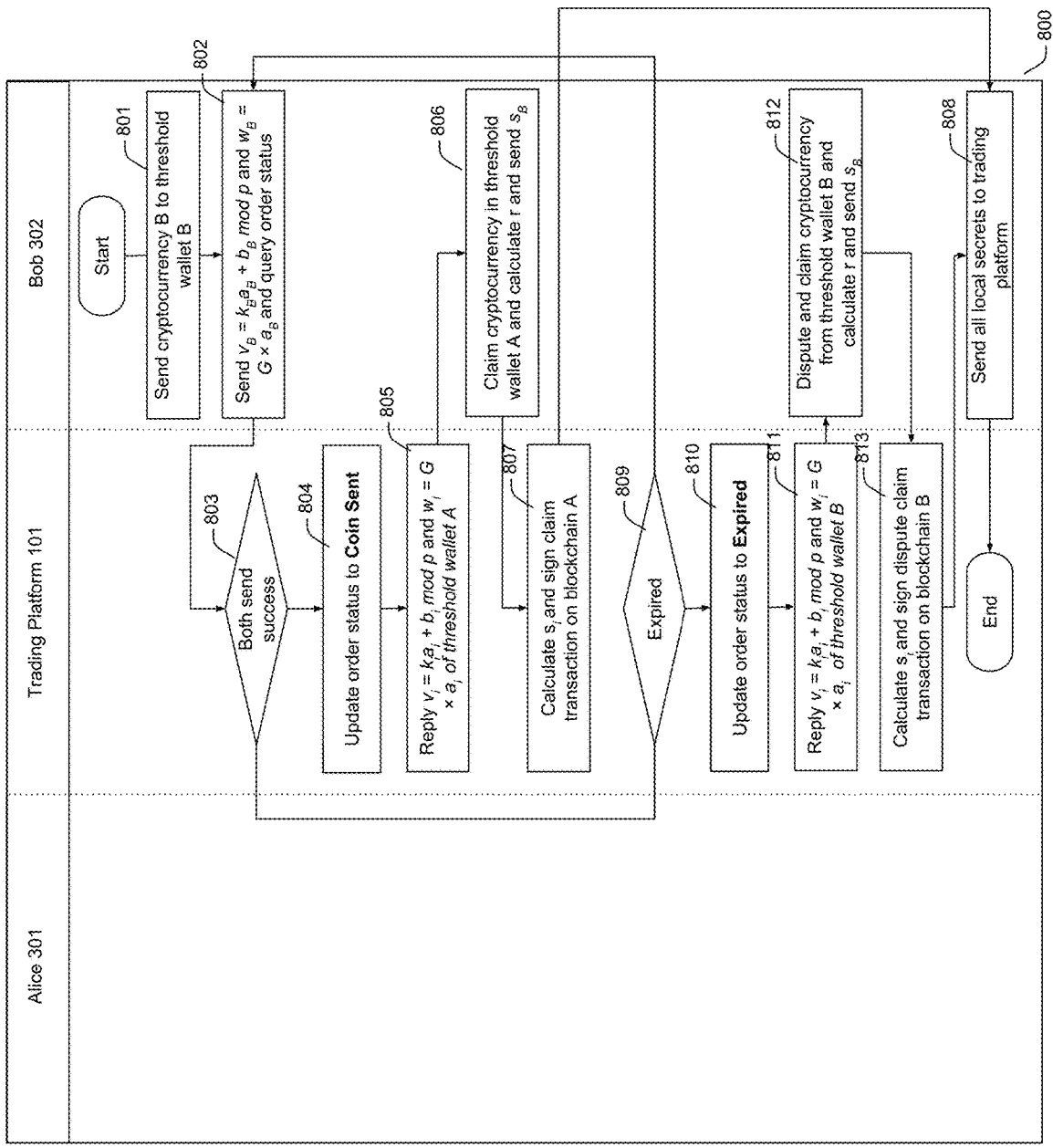
FIG. 8 illustrate a flow diagram, utilized by embodiments of the present application, which implements a protocol for two exchange parties on sending and claiming cryptocurrency to and from the threshold escrow wallets.

FIG. 8 illustrates a flow diagram, utilized by embodiments of the present application, which implements a protocol for two cryptocurrency exchange parties sending and claiming crypto assets.

The goal of this protocol is to allow multiple cryptocurrency exchange parties exchanging their crypto assets using the threshold wallet generated in 700. Protocol 800 is only one example of having two parties to trade crypto assets and is not intended to suggest any limitation on the number of involved trading parties. The FIG. 7 only illustrates Bob 302 for exchanging his cryptocurrency from crypto asset B to crypto asset A and Alice 301 will do the same for exchanging her crypto asset from crypto asset A to crypto asset B. In step 801, Bob 302 sends his crypto asset B to the threshold wallet B on blockchain B. In step 802, Bob 302 raises a request to trading platform 101 to check if Alice 301 has sent crypto asset to threshold wallet A and also send the $v_B = k_B \alpha_B + b_B$ mod p and $w_B = G \times \alpha_B$ to trading p2p cryptocurrency trading platform 101. In step 803, p2p cryptocurrency trading platform 101 then check if the crypto assets are both appeared in threshold wallet A and B on blockchain A and B respectively. Further p2p cryptocurrency trading platform 101 then updates the order status to Coin Sent 804 and reply Bob 302 with $v_i=k_i a_i+b_i$ mod p and $w_i=G \times a_i$ for $i \in (M_1, M_2)$ of threshold wallet A 805. After that, in step 806, Bob 302 may calculate r 610 and $s_B$ 611 for threshold wallet B and sends them via a claim request to p2p cryptocurrency trading platform 101 together with the cryptocurrency transaction details. In step 807, p2p cryptocurrency trading platform 101 calculates r 610 and $s_i$ for $i \in (M_1, M_2)$ 611 for threshold wallet B and compute s=Exp-Interpolate($s_{M1}$, $s_{M2}$, $s_B$) mod q in step 612 for the signature and then send the cryptocurrency transaction to blockchain A. In step 803, if the crypto assets are not having enough cryptocurrency ready in the threshold wallet, the p2p cryptocurrency trading platform 101 will check if wallets have been expired. If they are expired, trading platform will update the order status to Expired 810 and allow Bob 302 claiming his crypto assets. In step 812, Bob 302 calculates r 610 and $s_B$ 611 for threshold wallet B and sends a claim request to trading platform 101 with the partial signature $s_B$ 611 together with the cryptocurrency transaction details on blockchain B for terminating the exchange. In step 813, trading platform 101 calculates r 610 and $s_{M1}$ and $s_{M1}$ 611 for threshold wallet A and compute s=Exp-Interpolate($s_{M1}$, $s_{M1}$, $s_B$) mod q 612 for the signature and then send the cryptocurrency transaction to blockchain A in order to refund Bob 302.

Figure 9:
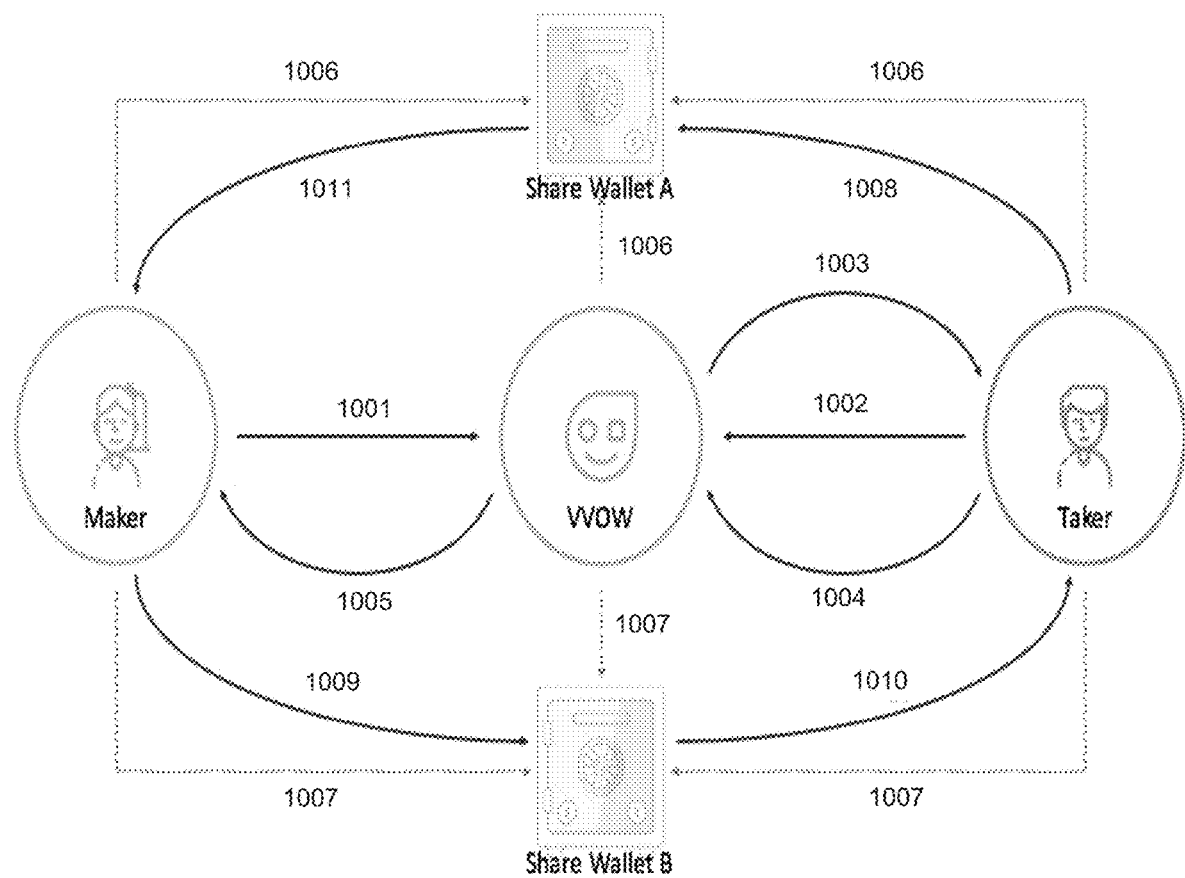
FIG. 9 illustrate a flow diagram, utilized by embodiments of the present application, which illustrates a life cycle of a trade enabled using the threshold signature cryptocurrency wallet.

FIG. 9 illustrates a flow diagram, utilized by embodiments of the present application, which illustrates a life cycle of a trade enabled using the threshold signature cryptocurrency wallet.

In a peer-2-peer environment, anyone can act as a market maker or taker at any point in time. The cross-chain value exchange protocol in the following as described below is not limited to any particular blockchain. Any blockchain that can support the threshold signature scheme can take advantage of p2p cryptocurrency exchange platform 101 to exchange crypto assets. In other words, all tokens that were implemented on the particular blockchain can be traded using the p2p cryptocurrency exchange platform 101.

The life cycle of a trade between a maker and taker enabled using the p2p cryptocurrency exchange platform 101 is illustrated in the FIG. 9. As represented in FIG. 9, shared Wallet A and shared wallet B are shared wallets jointly created by a maker, a taker and the mediator/p2p cryptocurrency exchange platform 101 on the corresponding blockchain A and B. In the next step, the maker and taker exchange token A and B.

At the step 1001, Maker calls a newOrder request to create a new order for trading token A with token B. The Maker may use the user equipment 102 for placing the order. In one embodiment, newOrders from multiple makers are collated into a list of orders.

At step 1002, the taker may call listOrder to request for the list of orders. The request for the list of orders may be made from the user equipment 102 associated with the taker.

At step 1003, the p2p cryptocurrency exchange platform 101 may reply with a list of orders.

At step 1004, the Taker may call matchOrder to specify a Maker's order to fill.

At step 1005, the p2p cryptocurrency exchange platform 101 may notify Maker of the match order and the quantity to be filled.

At step 1006, the Maker, Taker and mediator may jointly create a threshold shared wallet A of token A and each party owns part of the threshold secret.

At step 1007, Maker, Taker and mediator may jointly create a threshold shared wallet B of token B, wherein each party owns part of the threshold secret.

At step 1008, Taker may send the required amount of Token A to shared wallet A At step 1009, Maker may send the required amount of Token B to shared wallet B.

At step 1010, the Taker may call withdraw to jointly sign a withdraw transaction with mediator/the p2p cryptocurrency exchange platform 101 and send the withdraw transaction to the blockchain B.

At step 1011, Maker may call withdraw to jointly sign a withdraw transaction with the p2p cryptocurrency exchange platform 101 and send the withdraw transaction to the blockchain A. The above protocol can be performed independently by a maker and taker. Regarding disputes, for example if any of the two parties sends less than the required amount of assets to the shared wallet within a predefined trading period, a taker or maker can call dispute Withdraw to jointly sign a refund transaction with the mediator to get their assets back.

Because of the security property of threshold wallet, no single participant can control the crypt assets. The application or usage of the proposed threshold wallet can be extended to provide secure crypto asset wallet service. In the previous example of FIG. 8, threshold wallets are created by Alice 301, Bob 302 and the mediator. What if Bob 302 is no longer in the picture and Alice 301 acts as the other party, i.e., Alice 301 will need to provide two secret shares to jointly generate the threshold wallet. So now, Alice 301 has two shares and the mediator also owns two shares. In this example, a secure wallet is created for Alice 301. The created wallet is secure in a sense that 1) no single party can sign any transaction alone with is setup. 2) If Alice 301 lost one of his share secrets, she can still use the remain one to sign transaction. 3) The above example is a (1-4) threshold wallet (allowing 1 missing secret share) example, it can be extended to (2-5) threshold wallet where Alice 301 will own 3 secret shares and 2 for the mediator. In such case, Alice 301 can sign transaction with her own secret shares and also can cosign with mediator's 2 shares. This can be extended to (t-n) threshold wallet where the above secure properties of a secure threshold wallet service apply. Further, this could be extended to multiple owners to a single shared threshold wallet as well.

Furthermore, the cross-chain exchange enabled by the p2p cryptocurrency exchange platform 101 provides traders with a trustless, direct and secure peer-2-peer environment to exchange crypto assets. Most of the daily transactions people make are peer-to-peer. As more and more physical assets are tokenized such as cars, houses or paintings etc., these items are more suited to being traded in a peer-2-peer way because these are private transactions that each party knows and chooses with whom to transact. Although a peer-2-peer marketplace reduces costs and facilitates free trade, it also introduces a large degree of counterparty risk. Most marketplaces exist to act as trusted arbiters providing escrow services. They also play an important role as a rating agency that provides an assessment of each seller's honesty.

The p2p cryptocurrency exchange platform 101 removes the need for a marketplace to act as a custodian of funds in trade. With the threshold signature scheme trading can be performed even if untrusted users are part of the network. Further, the p2p cryptocurrency exchange platform 101 enables peer buyers and sellers to exchange crypto assets directly with a simple swap of the threshold wallet. As it is a simple swap action, it can take place within the same chain or across two different chains. Traders will not need to send their assets to a custodian wallet which they have no control of but rather they send the assets in trade to a shared wallet of the counterparty. The p2p cryptocurrency exchange platform 101 also allows each party to choose with whom they are going to trade. This is important in tokenizing physical item trading.

The protocol enabled by p2p cryptocurrency exchange platform 101 is implicitly secure since there is no centralized wallet involved in the trading process which invites and attracts hackers. There is also no single party that has full control of the trading wallets. All swap wallets are securely guarded by the buyer, seller and the mediator/p2p cryptocurrency exchange platform 101. A hacker needs to hack two of these parties in order to gain control of the assets in trade which is unlikely to be worth the effort. Also, the window of opportunity for hacking will be very short because the trading wallet will only exist during the trade and disposal after the trade. For a trade to be completed, there will always be at least two parties, one who provides an order, are denote as a maker, and a taker who is the party that fulfils the order.

In the current crypto currency trading market, there might not be enough tokenized physical assets to trade. However, there are a lot of coins, utility-tokens and crypto assets to trade in the meantime. As stated above, Trade in performed in three simple steps namely:

1. Choose the pair of assets market takers want to convert to and from. The p2p cryptocurrency trading platform 101 will display an updated exchange rate calculated from the order book.

2. Input the amount of asset to convert within the maximum and minimum quantities that the system allows. Also input the address that will receive the converted coins or tokens.

3. Send the exact amount of assets to the co-generated share threshold wallet address of the source asset. After verifying the correct amount, p2p cryptocurrency trading platform 101 will then co-sign the withdrawal transaction with the market taker to receive the converted amount of sold assets.

As compared to custodial type of trading the instant trading enabled by the present application has following advantages.

Easy of Use

The instant marketplace only takes three steps to initiate a trade. The user interface is designed to be extremely simple and easy to understand. The fact there is no need to create an account before any trade takes place means the process is further streamlined.

Non-Custodial Trade

Before the trade, assets are held in the asset owner's own wallet. When trading, assets are sent to a share threshold wallet that enables the trader to own one of the controlling secrets which the platform 101 has no full control over. This minimizes custodial risk by removing the time needed for the trader's funds to be stored in non-segregated hot wallets that belong to the centralized exchange.

Full Control of Funds

With the instant marketplace enabled by the platform 101, a trader has full control of his/her assets because they are held in a personal wallet. This is even better than what is offered by current instant exchanges because it does not hold assets even for a short period of time during the transfer window (most instant exchanges do). Asset owners also have a share of control of the trading wallets.

Security

A market taker or end user retains full control of their wallets and this is a very good benefit in terms of security. Large exchanges are often the target of hackers and are sometimes successfully hacked. With threshold wallet model enabled by the present application, if hackers successfully hacked the platform 101 secrets, they will not be able to withdraw the funds from the trading wallets because they have to gain access to the end user's secrets as well in order to get enough secret shares to sign transactions. As a small and smart target, end users are unlikely to be singled out. If the end user takes necessary precautions, the chance of being hacked is very unlikely.

No Account Registration

Market takers do not need to provide personal information to register for an account in order to make a transaction on the platform. This means that they are anonymous to the platform 101 and they do not need to worry that their data will be used for other purposes. They also enjoy the freedom of not being committed to a single exchange with the use of their own wallets for trading.

For Market Makers

With instant marketplace service, the platform 101 enables market takers or users to exchange their crypto assets quickly, without any registration process.

What is claimed is:

1. A system for cryptocurrency exchange between multiple parties using threshold signature cryptocurrency wallets, the system comprising:
   a processor;
   a memory storing instructions, wherein the instructions, when executed by the processor, cause the processor to perform operations, the operations comprising:
      creating threshold signature cryptocurrency wallets shared between a set of parties and a mediator for trading cryptocurrencies, wherein the mediator is enabled over a p2p cryptocurrency trading platform server computer, the set of parties are enabled over user equipment's and the threshold signature cryptocurrency wallets are enabled over blockchain networks, wherein the set of parties comprises at least one buyer and at least one seller, wherein the threshold signature cryptocurrency wallets comprises at least one threshold signature cryptocurrency wallet for the at least one seller's cryptocurrency and at least one threshold signature cryptocurrency wallet for the at least one buyer's cryptocurrency;
      dividing a threshold private key, corresponding to each of the threshold signature cryptocurrency wallets, into n shares based on (t, n)-threshold signature scheme, wherein t and n are natural numbers, n is the number of the shares, t is a threshold regarding whether a signature can be generated, the (t, n)-threshold signature scheme distributes n shares, of the threshold private key, such that any group of at least t+1 parties generate the threshold private key, wherein each buyer and seller, from the set of parties, owns one or more share of the threshold private key and the mediator owns the remaining shares of the threshold private key, t is greater than or equal to (n−1)/2 such that the mediator cannot generate a signature by its own;
      sharing masked shares, corresponding to the threshold private key for each of the threshold signature cryptocurrency wallets, by the set of parties and the mediator;
      validating correctness of all masked shares corresponding to the threshold private keys by the set of parties and the mediator; and signing
one of a withdrawal cryptocurrency transaction jointly by the set of parties and transferring the correct amount of cryptocurrency into the threshold wallets for exchange within a predetermined time period, or a withdrawal deposit transaction jointly by at least one party and the mediator;

wherein the p2p cryptocurrency exchange platform server computer enables all of parties to generate a shared wallet by joint creation of public key and joint signature generation, the p2p cryptocurrency exchange platform server computer enables each party to generate a local secret $\alpha_{ii}$ and shared secrets $\alpha_{ij}$, the shared secrets $\alpha_{ij}$ is sent to other parties, such that each party holds a local secret $\alpha_{ii}$ and shared secrets $\alpha_{ji}$ from other parties; the p2p cryptocurrency exchange platform server computer enables each party to generate a partial public key $Q_i = G \times \Sigma \alpha_{ji}$, where G is a finite field of elliptic curve calculation and share the partial public key with other parties, such that a complete public key can be obtained by combining partial public keys $Q = \oplus Q_i$; the public key is then used as a share wallet address, such that the share wallet address is the same as a wallet address on a different blockchain;

wherein as participants of the cryptocurrency exchange between the multiple parties, the at least buyer, the at least seller, and the mediator each is assigned a party number from i=1 . . . n, and an elliptic curve with cardinality q and generator G is selected;

for each participant $P_i$, selecting a random polynomial $f_i(x)$ of degree t subject to a chosen secret $a_0^{(i)}$ as its free term, $P_i$ then sends $f_i(j)$ to all other participants $P_j$;

each participant $P_i$ broadcasts $a_k^{(i)}G$ $\forall k=\{0, \ldots, t\}$ to all other participants $P_j$ which are its polynomial coefficients; $P_i$ also broadcasts $f_i(i)G$ $\forall j=\{1, \ldots, n\}$ which are evaluation points;

each participant $P_{j<>i}$ can verify that $\Sigma^t_{k=0} j^k a_k^{(i)}G$ is equal to $f_i(j)$ and that $f_i(j)G$ is consistent with his share; each participant also verifies that his share is consistent with other shares by checking $a_0^{(i)}G = \Sigma_{j \in B} b_j f_i(j)G$ where b is the Lagrange interpolation coefficient, each share is calculated as $\Sigma^n_{j=1} f_j(i) \mod q$;

wherein the cryptocurrency exchange enables exchanges among a buyer whose party number is A, a seller whose party number is B, and two mediators whose party numbers are $M_1$, $M_2$, the buyer places an order on the p2p cryptocurrency exchange platform server computer by providing his randomly generated public key together with the price, exchange cryptocurrency pair and maximum and minimum trading volume to the p2p cryptocurrency exchange platform server computer to see if anyone is interested in his trading pair with his listed price;

the p2p cryptocurrency exchange platform server computer generates 2 public keys representing the mediators and lists the order with these 2 public keys together with the price, cryptocurrency pair and maximum and minimum trading volume together with the public key of the buyer;

the seller selects 2 sets of 6 random polynomials $f_i(x)$ of degree t subject to his chosen secret $a_0^{(i)}$ as its free term, and each set is used for different cryptocurrency of the trading pair;

the seller sends $Enc_j(f_i(j))$ to all other participants $P_j$ for $j \in (M_1, M_2, A)$ where $Enc_j(x)$ represents encrypting the value x using the public key of $P_j$ for $j \in (M_1, M_2, A)$, together with $a_k^{(B)}G$ and $f_B(j)G$, for $j \in (M_1, M_2, A)$;

the p2p cryptocurrency exchange platform server computer performs a first zero-knowledge proof (ZKP) to verify the local secrets from the seller, in response to the first ZKP passing, the p2p cryptocurrency exchange platform server computer selects 4 sets of 6 random polynomials $f_i(x)$ of degree t subject to his chosen secret $a_{M1,0}^{(i)}$ and $a_{M2,0}^{(i)}$ as the corresponding free term and 2 sets are representing $M_1$ and the other 2 sets are representing $M_2$, the p2p cryptocurrency exchange platform server computer replies $Enc_B(f_{M1}(B))$ and $Enc_B(f_{M2}(B))$ together with $a_k^{(i)}G$ and $f_i(B)G$, for $i \in (M_1, M_2)$ to the seller and updates the order status to matched;

the seller performs a second ZKP, and, in response to the second ZKP succeeding, waits for the buyer acceptance;

the p2p cryptocurrency exchange platform server computer sends a match order notification from the p2p cryptocurrency exchange platform server computer together with $Enc_A(f_i(A))$, $a_k^{(i)}G$ and $f_i(A)G$, for $i \in (M_1, M_2, B)$ to the buyer;

the buyer performs a third ZKP to verify the local secrets owned by the p2p cryptocurrency exchange platform server computer and the seller, in response to the third ZKP succeeding, the buyer is allowed to accept or reject the match order;

in response to the buyer accepting, the buyer selects 6 random polynomials $f_i(x)$ of degree t subject to his chosen secret $a_0^{(i)}$ free term;

the buyer sends $Enc_j(f_A(j))$ together with $a_k^{(A)}G$ and $f_A(j)G$, for $j \in (M_1, M_2, B)$ to the p2p cryptocurrency exchange platform server computer and updates the order status to accepted;

the p2p cryptocurrency exchange platform server computer performs a fourth ZKP to verify the local secrets of the buyer, in response to the fourth ZKP being verified, the p2p cryptocurrency exchange platform server computer sends $Enc_B(f_A(B))$ together with $a_k^{(A)}G$ and $f_A(B)G$ to the seller;

the seller performs a fifth ZKP to verify the local secrets of the buyer;

the buyer, the p2p cryptocurrency exchange platform server computer and the seller calculate the threshold wallet address.

2. The system of claim 1, wherein a broadcasting channel is enabled for public message exchange between the set of parties and the mediator for generating the threshold signature cryptocurrency wallets.

3. The system of claim 1, wherein a secure channel is enabled for each party for secret message exchange.

4. The system of claim 1, wherein the signing for withdraw deposit transaction of cryptocurrency transaction is jointly performed by
multiple parties, or
one of the parties together with the mediator, or
all of the parties.

5. The system of claim 1, wherein the operations further comprise:
recording historical transaction associated with the set of parties, with both successful and unsuccessful transactions;
displaying the full trading history of the registered makers and takers; and
creating threshold crypto assets wallet and co-own the threshold wallet by the registered makers and takers.

* * * * *